THE RELATIONSHIP OF THE FUNCTION $F(\theta, b)$

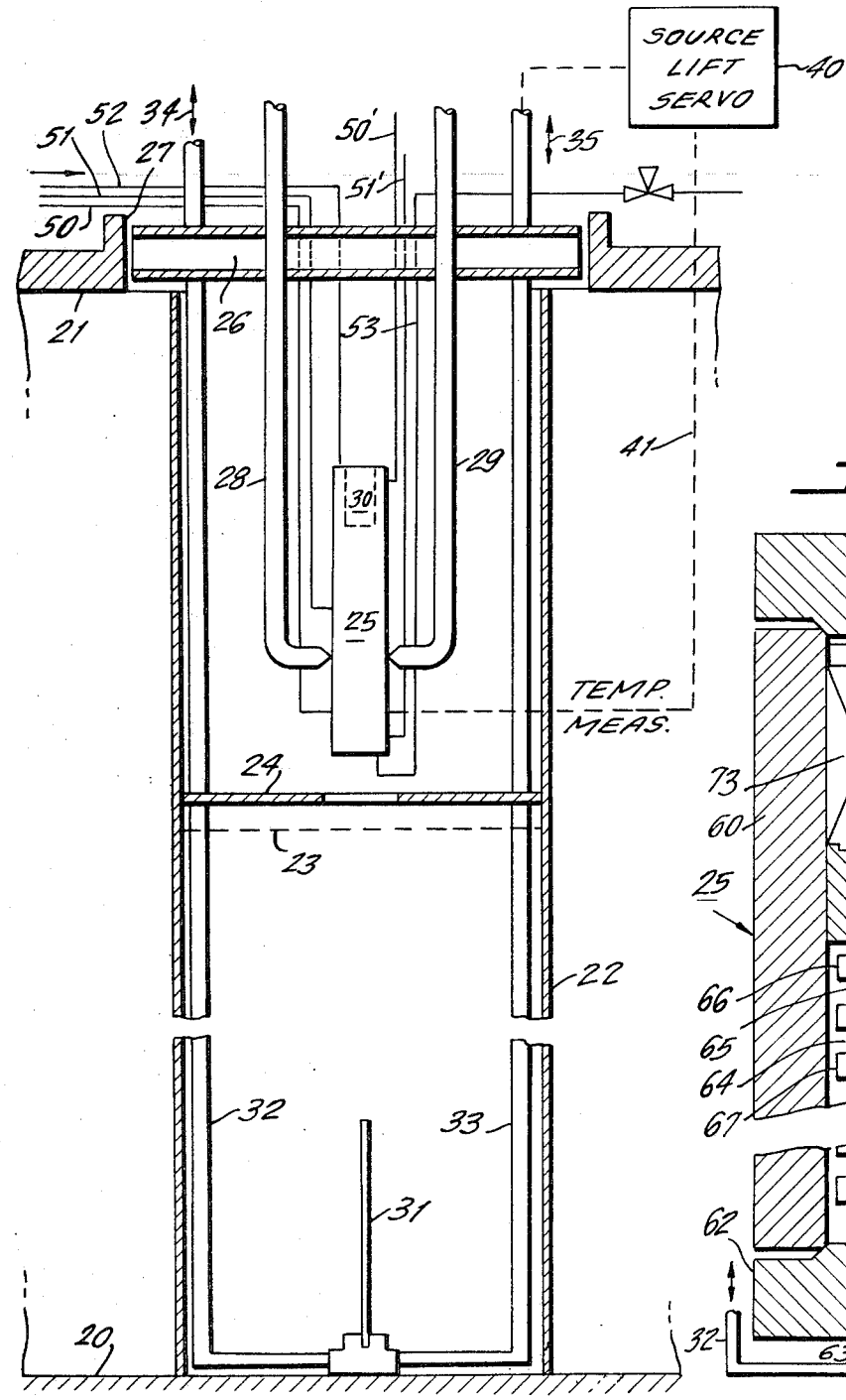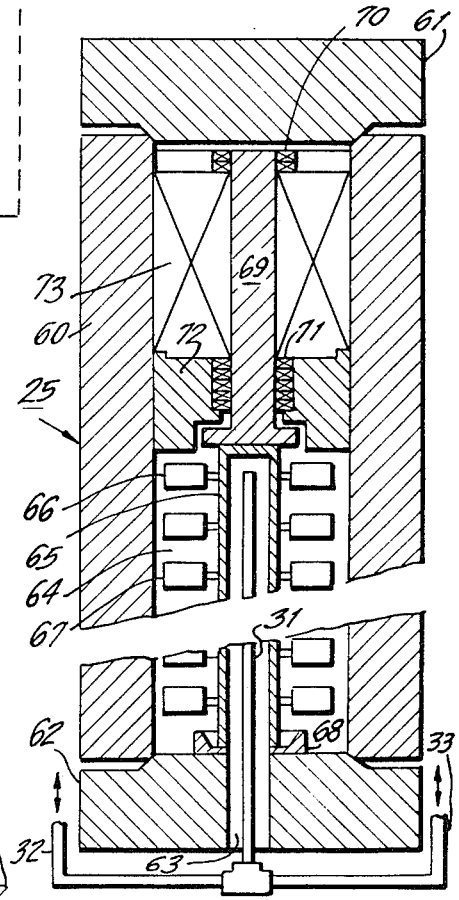

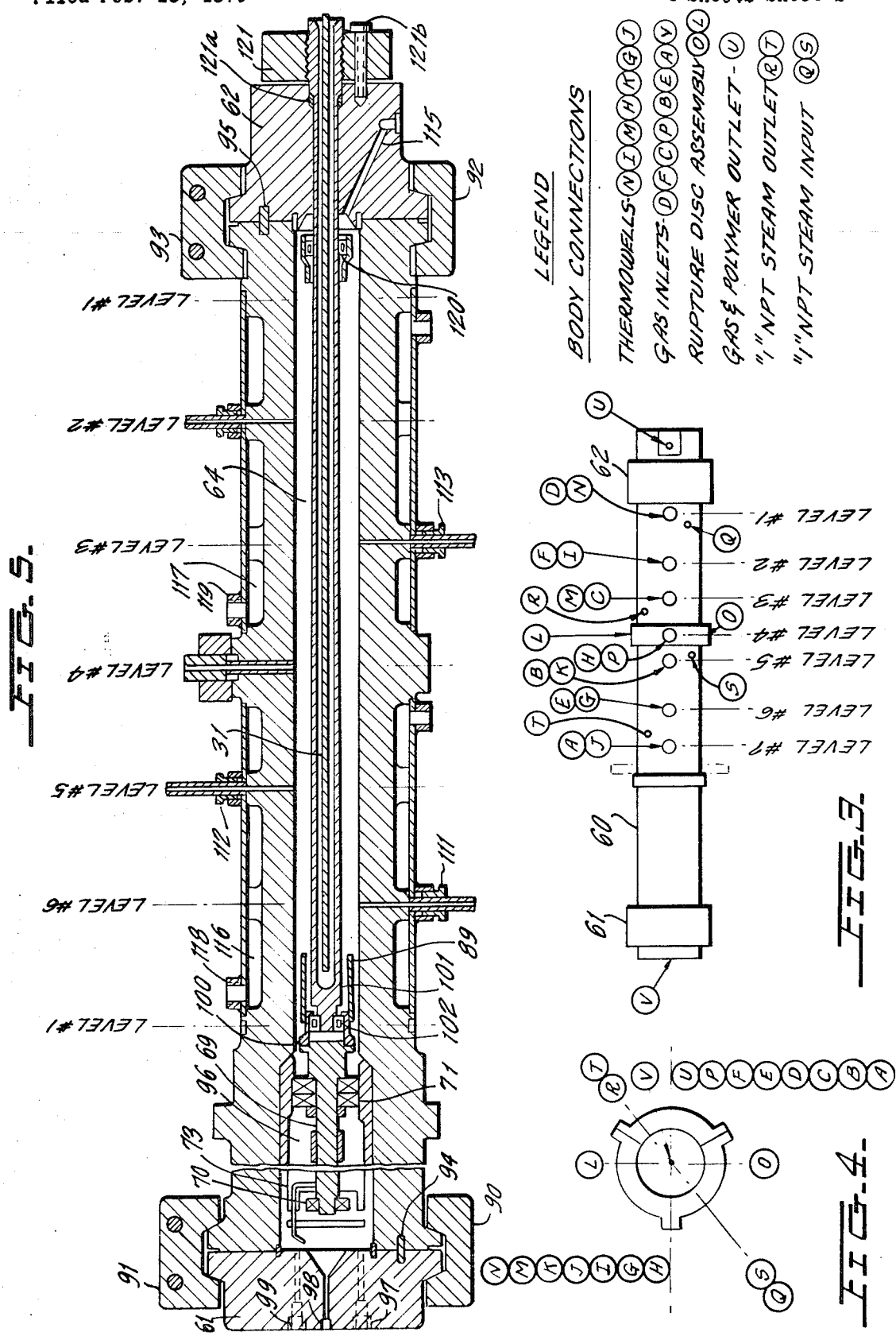

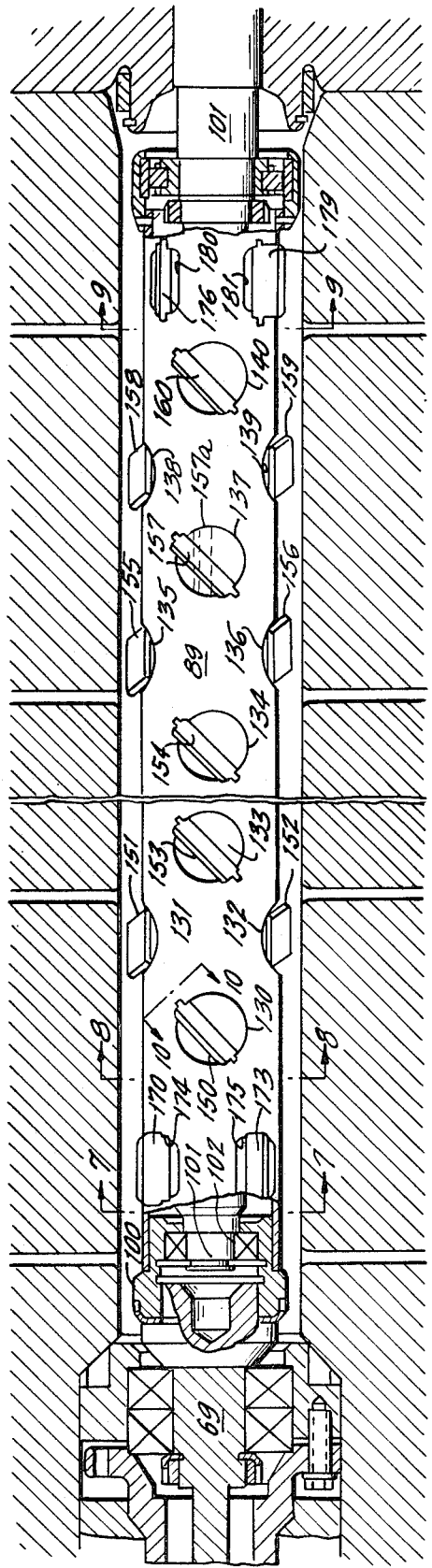

THE FUNCTION $F(\theta, b)$
F vs b
FOR $F = 10^{-9}$ TO $10$
$b = 0$ TO $7$
$\theta = 1°$ TO $90°$

United States Patent Office 3,708,410
Patented Jan. 2, 1973

3,708,410
STIRRER AND RADIOACTIVE SOURCE FOR
POLYMERIZATION REACTOR
Gerald M. Platz and William H. Palmer, Champaign, and James W. Mauck, Atwood, Ill., assignors to National Distillers and Chemical Corporation, New York, N.Y.
Filed Feb. 13, 1970, Ser. No. 11,248
Int. Cl. B01j 1/00, 1/10
U.S. Cl. 204—193     5 Claims

ABSTRACT OF THE DISCLOSURE

A polymerization reactor having a hollow stirrer drum which is an elongated drum having apertures therethrough with paddles extending across the apertures. The stirrer drum is concentrically disposed about an elongated source of gamma radiation which serves as the energy source for a polymerization reaction of material introduced into the reactor. The stirrer drum divides the reactor into two concentric and approximately equal volumes, one internal of the stirrer drum and one external of the stirrer drum, with the material being stirred and inter-mixed between the two chambers through the paddle apertures by rotation of the stirrer drum.

This invention relates to a stirrer construction, and more particularly relates to a stirrer construction for a polymerization reactor using a centrally disposed gamma radiation source for initiating the polymerization reaction.

The polymerization of materials, such as ethylene, is a well known field where the polymerization is produced by the use of certain catalysts, such as peroxide which is admixed with ethylene gas under pressure. It is also known that the polymerization reaction can be initiated by nuclear radiation, particularly gamma rays. A process of this type is generally described in U.S. Pat. 3,058,899 in the names of Yanko and Calfee, which issued Oct. 16, 1962.

The radiation initiated reaction has numerous advantages over the catalyst initiated reaction (typically, a peroxide catalyst) in the polymerization of ethylene. Some of these advantages are:

(1) In the peroxide initiated reaction, the catalyst must thermally decompose to form free radicals which then react with ethylene to start the polymer chain. Where gamma radiation is used, the radiation directly interacts with ethylene thereby to directly initiate the polymer chain.

(2) The use of chemical catalysts restricts the operation to selected narrow temperature ranges. Several catalysts are required to cover an entire range. In the radiation process, any temperature range can be used.

(3) In the catalyst initiated reaction, violent mixing is required to distribute the catalyst uniformly and to prevent catalyst initiated decomposition. A less violent mixing can be used with the radiation initiated process.

(4) A uniform addition of the catalyst to the reactor is difficult whereas a radiation source inherently provides constant and known intensity.

(5) A serious disadvantage in the catalyst initiated reaction is that of catalyst residue and catalyst carrier traces in the product which is formed. The radiation initiated process produces an extremely high purity product with the reaction being completed within the reactor. Note that in the catalyst process, the reaction can continue in downstream lines and equipment.

(6) When using the catalyst reaction, shut-down is normally required for catalyst changes whereas the radiation process permits continuous operation during changeover to a new product.

(7) The catalyst process is difficult to control with respect to various desired temperature profiles along the axis of the reactor. Such temperature profiling can be more easily controlled in a radiation reactor by varying the distribution of the radiation source intensity over the length of the reactor.

(8) The handling of a radiation source is safer, less complex, and less expensive than the storing, mixing and pumping of chemical catalysts.

From the foregoing, it can be seen that the use of the radiation initiated process has numerous advantages over the catalyst process, including flexibility of production, continuous production, less maintenance, variable temperature characteristics, simplified handling, purer products, and as a net result, a less expensive product.

While the use of radiation to initiate polymerization reactions is known, the prior art does not teach how the technique could be used for a commercially acceptable process providing, among other things, continuous rather than batch production.

The present invention is for a novel arrangement of a radiation source with respect to a stirrer assembly of novel construction which permits a highly efficient and continuous process for the production of polymers. More specifically and in accordance with the invention, the reactor construction includes an outer high strength steel tube or casing which also serves effectively to shield a radiation source contained along the axis of the steel tube. The outer steel casing receives a second relatively thin-walled steel tube along its axis. A radiation source consisting of elongated "pencils" of Cobalt 60, or any other desired gamma ray source, with a useful half-life, is then contained within this second relatively thin steel cylinder.

A novel rotatable stirrer drum is then inserted into the annular cavity between the concentric steel tubes and divides the annular cavity into an inner and outer annulus which communicate with one another through openings disposed along the length of the stirrer drum. These openings further receive paddles which may be disposed at an angle to the axis of the stirrer so as to agitate the material within the reactor, with the agitation causing circulation of the fluid between the two annular regions, thereby causing effective mixing of the material being polymerized. This material is then circulated and recirculated within the reaction chamber and is drawn out of the reactor through suitable discharge ports. The agitated fluid within the reaction chamber is exposed to a uniform radiation intensity within the reaction chamber in order to initiate the polymerization reaction. Obviously, all other elements of the system of production connected to the input of the reactor and then to the output of the reactor may be standard and well known and of the type presently used with the catalyst initiated polymerization system.

The stirrer drum assembly mentioned above can be rotated through a motor contained directly in the interior of the reactor but isolated from the polymerization products which will be created in the reactor. In order to control the reaction, the elongated radioactive source can be adjustably moved axially along the center of the reactor either manually, or by a suitable remotely operated servo system which may be of any desired type.

The reactor of the present invention will be understood to be capable, in view of the design thereof, to withstand the relatively high pressures which are required in certain polymerization reactors. For example, in one particular embodiment of the invention in which the reactor is used for the polymerization of ethylene, pressures of from 10,000 to 45,000 p.s.i. may be used. These pressures are easily contained by the thick-wall steel reactor shell or casing used for the reactor. Moreover, the reactor shell is also well adapted to provide shielding of the radiation source disposed therein.

From the foregoing, it is, therefore, a primary object of this invention to provide a novel high pressure stirrer reaction chamber using nuclear radiation for polymerization reactions wherein minimum radiation energies and minimum shielding are needed.

Another object of this invention is to provide a novel process for the continuous production of polymerized products of high purity.

Still another object of this invention is to provide an efficient radiation polymerization vessel having improved mixing properties and great process variation as compared to a catalyst inducted reaction.

These and other objects of this invention will become apparent when taken in connection with the drawings, in which:

FIG. 1 schematically illustrates the reactor system of the invention as mounted in a facility.

FIG. 2 is a schematic cross-sectional view of the reactor configuration for the reactor system of FIG. 1.

FIG. 3 is a side plan view of the actual reactor construction schematically illustrated in FIG. 2.

FIG. 4 is a top view of FIG. 3.

FIG. 5 is a detailed cross-sectional view taken along the axis of the reactor of FIG. 3 with the major body of the stirrer drum removed to expose the radioactive source container.

FIG. 6 is a cross-sectional view similar to FIG. 5 and illustrating the stirrer drum in detail.

FIG. 7 is a cross-sectional view of FIG. 6 taken across the section line 7—7 in FIG. 6.

FIG. 8 is a cross-sectional view of FIG. 6 taken across the section line 8—8 in FIG. 6.

FIG. 9 is a cross-sectional view of FIG. 6 taken across the section line 9—9 in FIG. 6.

FIG. 10 is a cross-sectional view of a single paddle section of the stirrer drum of FIG. 6 taken across the section line 10—10 in FIG. 6.

Figure 11:
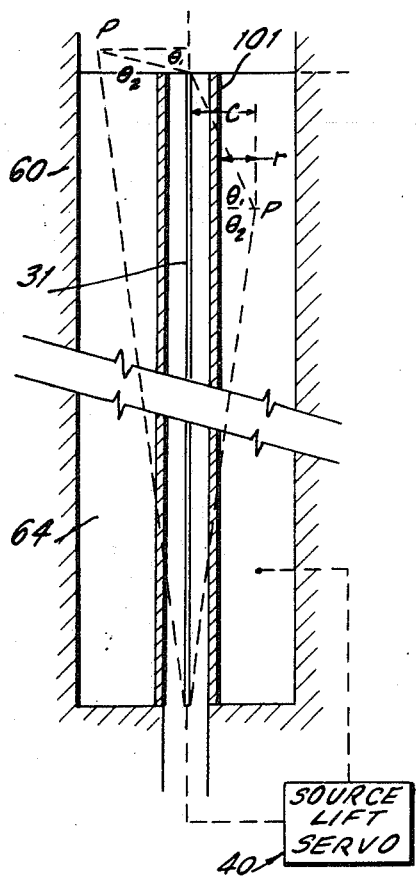

FIG. 11 schematically illustrates the reactor of the foregoing figures to demonstrate the operation of the control of the system.

Figure 12:
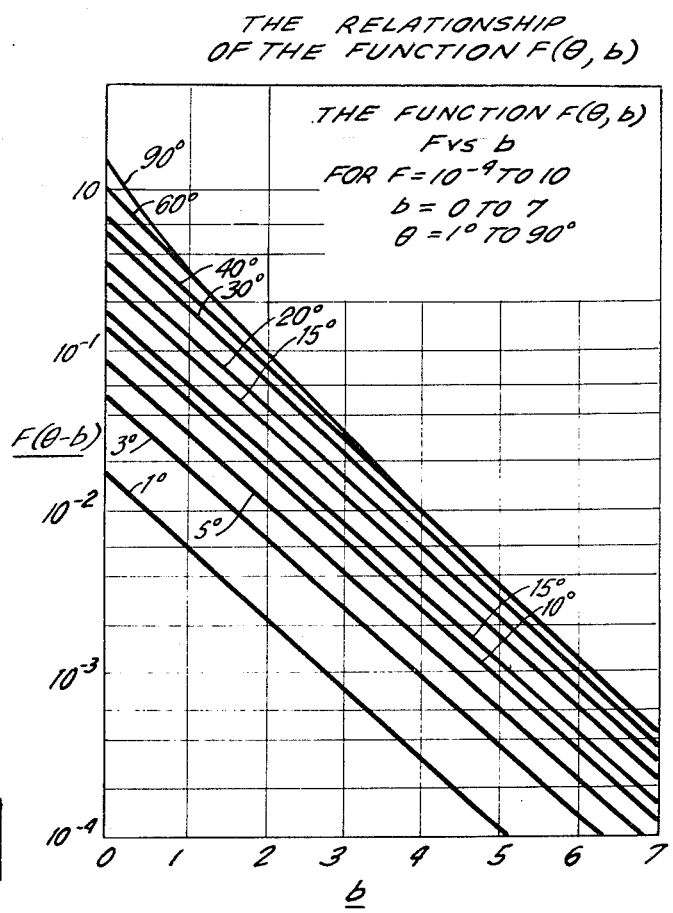

FIG. 12 shows a function of the various relationships used in calculating the operation of the control operation.

Figure 13:
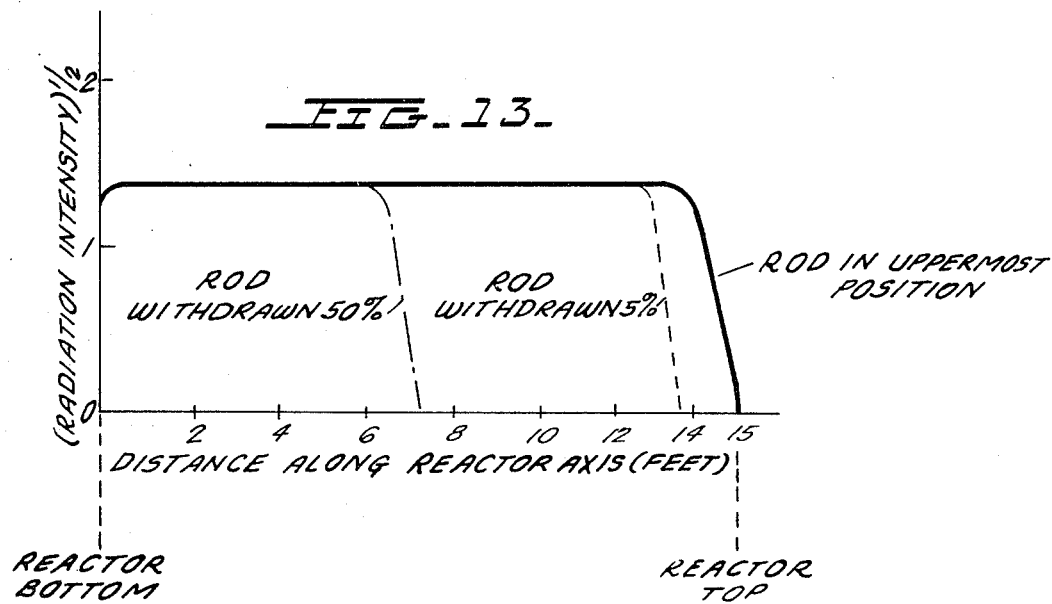

FIG. 13 graphically illustrates the radiation intensity (which is related to production rate) of the reactor for the radiation rod in three different positions.

Referring first to FIG. 1, the reactor is schematically illustrated as being supported on a ground floor 20 and extending to an upper floor 21. The reactor assembly includes a large cylindrical stainless steel shell 22 which could have a diameter, for example, of 10 feet and a suitable height. The stainless steel shell 22 could be inserted in a pit which is lined with the stainless steel shell, if desired. The stainless steel shell 22 will have any desired thickness necessary for suitable structural strength. Radioactive shielding is provided by concrete, or the like. Alternatively, the entire reactor can be placed in a pit within a suitable facility.

Shell 22 is then filled with deionized water to the dotted line level 23 where the deionized water serves to shield radioactive "pencils" which can be stored in water when the reactor is not in use, as will be described. The water level above ground may be about 15 feet. A work platform 24, which could be a grating, is then secured above the water level 23 and the main reactor structure 25 is supported above the work platform 24 and water level 23 by suitable mechanical supports (not shown).

The entire reactor assembly will be contained in a suitable facility provided with all necessary safety precautions which are well known when handling radioactive materials. The support for the reactor may include the schematically illustrated removable support rack 26 which is shown at the upper floor level and surrounded by a suitable water curb 27. Two hollow vent stacks 28 and 29 of a standard type then communicate with the interior of reactor 25 in any desired manner so that the high pressure within reactor 25 can be exhausted to the exterior of the facility in the event of the build-up of excessively high pressures within reactor 25.

An operating motor 30 is mounted within the reactor 25 for driving a stirrer drum within the reactor 25. Polymerization reactions within reactor 25 are initiated by an elongated radioactive "pencil" or rod 31 which is mounted on lift rods 32 and 33 which are movable in the direction shown by arrows 34 and 35 to move the pencil source 31 coaxially within the interior of reactor 25. The radioactive rod 31 may contain a plurality of pencils, each about 1 foot long which are stacked end to end, with each of the individual pencils containing a suitable source of gamma radiation, such as wires or pellets of Cobalt 60. Such materials are commercially available.

In one embodiment of the invention, a sufficient number of such pencils are stacked to a length of about 15 feet, with the reaction zone within reactor 25 also being about 15 feet. Obviously, the particular length of the pencils will depend upon the size of the reactor which will depend upon the production capacity desired. Lift rods 32 and 33 may then be manually operated by any suitable drive mechanism or, if desired, may be operated through a servo-type system.

FIG. 1 illustrates a typical servo system in schematic fashion wherein the source lift servo 40 is connected to rods 32 and 33 to move the rods in an axial direction and in and out of the reactor 25 to adjust the position of the pencil source 31 within reactor 25. Suitable thermocouples are then connected to reactor 25 and provide an input signal over the dotted line 41 to the source lift servo 40. In this manner, a constant temperature can be maintained in a particular region of reactor 25 by continuously varying the exact position of source rod 31 within reactor 25 in any suitable manner.

Process feed lines, such as feed lines 50, 51 and 52, are then connected to various regions of the reactor to supply the material to be polymerized within the reactor and a product return line 53 extends out of the reactor 25. A typical material which may be applied to one or more of the feed lines 50 to 52 could be ethylene gas. High-pressure steam or some other suitable heat exchanger medium may also be applied to pressure jackets surrounding the reactor 25 over lines, such as lines 50' and 51', in order to bring the reactor to a particular temperature (or temperature profile) required for the particular reaction which is desired.

FIG. 2 schematically illustrates the configuration of the reactor 25 of FIG. 1. Components similar to those of FIG. 1 are given similar identifying numerals in FIG. 2 and throughout the application.

The reactor 25 of FIG. 2 consists of a high strength steel reactor shell 60 having a top head plate 61 and a bottom head plate 62. The reactor contains an elongated single-ended tube 63 which receives the elongated source 31 which is disposed concentrically within an elongated reaction chamber 64 within which the polymerization reaction (or any type reaction, in general) is to occur. Note that input and output lines are not shown in FIG. 2, but will be described in detail hereinafter.

In order to stir or agitate the product in the reaction chamber 64 and in accordance with one feature of the invention, the chamber 64, which encloses the radioactive source 31, receives an elongated hollow stirrer drum 65 which surrounds the source rod tube 63. Drum 65 has paddle blades schematically illustrated, for example, by paddle blades 66 and 67, whereby the drum 65 and the blades carried thereby are rotated in the reaction chamber 64. To this end, the lower end of drum 65 is carried in a bearing 68 mounted on the bottom head 62 and is connected at its top to a stirrer shaft 69. The stirrer shaft 69 is carried in bearings 70 and 71, with the bearing 71 being contained within a motor shielding block 72 which may be of steel and is used, essentially, to contain polymerized products below the level of the shielding block 72.

A suitable motor, schematically illustrated as motor 73, then has a rotor connected to the shaft 69 and a stator connected to the body 60. Motor 73 may be of any desired type. The rotational speed of the stirrer drum 65 can be between 120 r.p.m. to 3,600 r.p.m. An adjustment of this rotational speed provides additional control of the temperature profile along the reaction zone 24 and will be adjusted depending upon the type of product which is to be manufactured.

FIGS. 3 and 4 show plan views of an actual reactor construction.

Referring to FIGS. 3 and 4, components similar to those of FIG. 2 are given similar identifying numerals. Thus, the elongated reactor shell 60 is a cylindrical shell enclosed at its top and bottom ends by the top head 61 and bottom head 62. The reactor, shown schematically in FIG. 3, is divided into seven reaction levels or regions and is provided with numerous connectors for input products and the like. Thus, there are provided connection regions along the lines and at the levels shown in FIGS. 3 and 4 (and identified by the legend alongside FIGS. 3 and 4) for connection of thermocouples in the various thermowells. There are also provided various gas inlets at the various reaction levels; a gas and polymer outlet; and inlets and outlets to the jackets for heating the reactor vessel. There is further schematically illustrated rupture disk assemblies to which the vent stacks 28 and 29 of FIG. 1 are connected whereby, when the pressure within reactor 25 exceeds a particular value, these disks rupture so that the pressure can be vented through stacks 28 and 29.

Referring next to FIG. 5, there is shown therein a cross-sectional view of FIGS. 3 and 4 taken along the axis of those figures. Components similar to those of the preceding figures are given similar identifying numerals.

FIG. 5 illustrates the reactor with the stirrer drum 89 (drum 65 of FIG. 2) removed for most of its length. The reactor shell 60 of FIG. 5 consists of an elongated hollow steel tube which can, for example, have an internal diameter of about 3.9 inches and a wall thickness of about 2¼ inches. The top cap 61 is fastened to the end of shell 60 by clamping flanges 90 and 91. The assembly may then be connected to any appropriate support structure for supporting the reactor. In a similar manner, the bottom head 62 is connected to shell 60 by clamping flanges 92 and 93 which are similar to flanges 90 and 91, respectively. Suitable locating dowel pins, such as dowels 94 and 95, can be used for locating the top and bottom heads 61 and 62 on the shell 60. The upper end of shell 60 is provided with an enlarged diameter 96 which contains an electrical motor 73 which may be of any suitable type and which can be energized by electrical leads brought in through openings, such as opening 97, in the top head 61. Other openings are provided, such as openings 98, and 99, for coolant feeds and pressure ports.

The stirrer shaft 69 is connected to the motor 73 and is mounted between the schematically illustrated bearings 70 and 71 which may be thrust bearings for supporting the stirrer shaft 69 so that it can be rotated without being axially moved.

The stirrer shaft 69 is then suitably bolted to an adapter structure 100. This adapter structure 100 is further connected to a hollow radiation rod receiving tube 101 through a suitable bearing arrangement 102 where the rod receiving tube 101 extends the remaining length of the reactor and protrudes through bottom head 62.

The rod receiving tube 101 is connected to flange 121 by a suitable thread. The flange 121 is further connected to the bottom head 62 by bolts, such as bolts 121b, whereby load may be applied to seal 121a by an axial clamping action between tube 101 and the bottom head 62. The seal 121a provides a rigid end support for the tube 101 and the pressure seal for the reaction chamber 64.

Tube 101 is an alloy steel tube having an internal diameter of about ⅞ of an inch, and an external diameter of about 1⅜ inches. Thus, the wall thickness of tube 101 will not apreciably interfere with the transmission of gamma radiation, but can serve to guide the motion therethrough of the radioactive pencil or rod 31 into the reactor space. The tube 101 is solid-ended at its top, and sealed to the reactor by seal 121a where it passes through the bottom of the reactor so that the pressure in chamber 64 cannot leak into the interior of tube 101.

The main reaction chamber 64 defined between the exterior of hollow tube 101 and interior diameter of shell 60 receives reactants through the various input connections at the various levels illustrated. For example, at level 5 an input channel 112 is illustrated and could be connected to an ethylene gas line. Similar gas inlets are provided along the length of the reactor, as indicated by the labeled gas inlets in FIGS. 3 and 4.

A plurality of thermocouple elements or other suitable temperature measuring elements are also provided as illustrated by the thermocouple devices 111 and 113. Note that gas entries and thermocouples can be interchanged, if desired.

An outlet channel is then illustrated as the outlet channel 115 at the bottom of the reactor and through which the output product will be taken from the interior of the reactor. Note, however, that output product can be taken out at any "inlet" level along the length of the reactor, if desired, and depending upon the precise type of stirrer arrangement which is used. Similarly, reactant can be introduced into the reactor at channel 115.

In order to bring the reactor to a suitable temperature, channels are formed in the outer wall of the reactor shell, such as channels 116 and 117, by way of example. These channels are then connected to suitable lines connected to the fitting nipples 118 and 119 in order to circulate steam, hot oil, cooling water, or any other suitable heat transfer media about the outer surface of reactor shell 60. The lower end of the stirrer drum 89 is mounted on the lower end of tube 101 as by bearing 120.

The configuration of the stirrer drum 89 is best shown in connection with FIGS. 6 to 10. Components similar to those of the preceding figures are given similar identifying numerals.

Referring first to FIG. 6, the stirrer drum 89 is illustrated in one embodiment of the invention as consisting of a hollow stainless steel drum having an outer diameter of 2⅞ inches and a wall thickness of ⅛ inch.

The drum is mounted on adapter 100 at its upper end and over the bottom bearing housing of bearing 120 at its lower end, and over the top bearing housing of bearing 102 on its upper end. A plurality of pairs of openings then extend along the length of the drum, which openings are displaced from one another by 180°, with adjacent pairs of openings rotated with respect to one another by 90° along the major portion of the length of the drum. Each of these openings may have a diameter of 1½ inches. Thus, in FIG. 6 there is shown openings 130 to 140. Similar openings are disposed on the opposite side of the stirrer drum 89 which cannot be seen in FIG. 6 which are coaxial with openings 130, 133, 134, 137 and 140. Note that adjacent pairs of openings, as described above, are rotated from one another by 90° as, for example, the relationship between opening 130 and the adjacent pair of openings 131 and 132. The center lines of adjacent pairs of openings are spaced by 1¹³⁄₁₆ inches.

It is to be understood that the specific dimensional relationships given above may be varied for any particular type of drum stirrer construction and that these dimensions were used only with the illustrated embodiment of the invention. Each of the openings in the drum, such as openings 130 to 140, then carry welded paddles, shown as paddles 150 to 160, respectively. The paddles of the embodiment illustrated in FIG. 6 are disposed at an angle of 45° to the axis of the stirrer drum 89 and, as shown in FIG. 10, have a pitch of 30°. Note that the stirrer drum 89 is to be rotated in a clockwise direction when seen in the section of FIG. 8 so that the paddle angle is pitched backwardly into the medium which is introduced into the reaction chamber whether exterior or interior of the stirrer drum 89. Obviously, direction of rotation depends on blade configuration. Further note that the bottom of paddles 150 to 160 have a straight edge which cuts across a cord of the cylindrical stirrer 89, as most clearly seen in FIG. 8 for the case of paddle 150 and its oppositely disposed paddle 150a. The pitch and angle of the various paddles described above are again merely illustrative of a particular paddle arrangement and other angles could be used if desired. Moreover, the angles of the various paddles can be changed within a given stirrer drum, if desired. Furthermore, the angle of the paddles with respect to the axis 89 can be zero for all or a portion of the paddles, as illustrated in dotted lines 157a for the case of paddle 157.

A particularly useful arrangement can be obtained where the first three or four sets of paddles at the top of the stirrer drum are angled and pitched, as shown, for example, for paddle 150, while the remaining paddles below this level are al pitched but parallel to the axis of the stirrer drum 89, as shown for the paddle 157a.

At the opposite ends of the stirrer drum, paddles which are parallel to the axis of the stirrer drum are provided for the major purpose of insuring agitation of the medium at these end locations and to force circulation of the fluid media bewteen the two annular regions and to avoid the presence of a "stagnant" zone.

Thus, in FIGS. 6 and 7, it can be seen that four parallel disposed but pitched paddles 170 to 173 are provided in elongated openings 174 and 175 for paddles 170 and 173, respectively. A similar arrangement is provided at the bottom of the stirrer drum, as shown in FIGS. 6 and 9 for the case of paddles 176 to 179 where paddles 176 and 179 of FIG. 6 are shown in connection with elongated openings 180 and 181, respectively.

FIG. 6 also shows the location of various fluid inlets (or outlets if operated in that manner) such as inlets 190, 191, 110 (previously described in FIG. 5) and 192. The drum 89 operates to divide chamber 64 into two regions, shown in FIGS. 7 to 9 as external region 200 and internal region 201. Preferably, regions 200 and 201 have the same cross-sectional area.

In operation, the rotation of the drum 89 and its various paddles will cause agitation of the gas mixture inserted into the reaction volume 64 with the gas being propelled and mixed by the moving paddle wheels, such as paddle wheels 150 to 160, and with the gas being circulated between the interior volume 201 and exterior volume 200 of the reaction chamber through the openings in the stirrer drum, such as openings 130 to 140. It has been found that an extremely efficient stirring action can be obtained in this manner. Moreover, it has been found that this stirring action can be extremely well controlled by the physical placement of the stirrer drum paddles and can be controlled to obtain selective mixing at various levels of the reactor by controlling the angle of the various paddles should such selective mixing be desired.

During the mixing action, gas will be admitted into the reaction volume, for example, through inlet 192, with this gas being mixed and circulated between the exterior and interior volumes 200 and 201 defined by the stirrer drum. Thus, a portion of the gas will recirculate around the drum and through the openings for any desired number of cycles before it is ultimately discharged through a discharge opening, such as discharge opening 115 in FIG. 5 or any of the selected openings 110, 190 or 191 in FIG. 6. Thus, an appropriately designed stirrer paddle can operate to maintain material within the reaction zone for any desired length of time. Moreover, by using a source of uniformly loaded high intensity radiation, such as rod 31 which carries Cobalt 60, or any other desired source of gamma radiation, the radiation intensity throughout the reactor is constant and uniform for any particular radial distance from the rod 31. Therefore, polymerization reactions will be initiated uniformly through the reaction volume.

It will be understood that the novel apparatus of FIGS. 3 to 10 permit the use of a continuous process, as contrasted to a batch process and avoids all the disadvantages which are inherent in the use of a catalyst initiated reaction where, for example, catalysts would have been injected into the various ports at the various levels along the reactor in the prior art. In this regard, it should also be noted that the novel stirrer drum 89 and its associated paddles and variations of paddle angles described hereinabove will operate well with a catalyst induced reaction, although the preferred mode of operation uses the novel centrally disposed radiation source 31 for initiating polymerization reactions.

In one typical example of the invention, ethylene gas was injected into ports 190, 191 and 192 at an average pressure of 30,000 p.s.i. Note that the reactor shown herein is useful for any range of pressures up to, for example, 45,000 p.s.i. The average temperature of reactor 60 was maintained at 475° F. by the reaction. Steam was circulated around the exterior of the reactor shell 60, as described in connection with FIG. 5. A source 31 was positioned within tube 101. The rate of gas flow into the reactor 60 was 334 pounds per hour, and a polymerized product was withdrawn from port 115 at the rate of 57.2 pounds per hour. The stirrer drum which can be rotated from between 120 r.p.m. to 3,600 r.p.m. was, in this example, rotated at 3,450 r.p.m. The jacket temperature was 369° F. The reactor provided a conversion rate of 17% with the remaining gas being cooled and recycled.

During this operation, the reactor temperature measured at the various thermocouples, shown, for example, in FIG. 5 was observed and the position of the rod 31 was manually controlled by withdrawing it slightly from tube 101 or inserting it deeper into tube 101, thereby to maintain prescribed temperatures in the reaction zone which ranged between 472° F. to 483° F. The average position of rod 31 was 88% inserted. As pointed out above, this operation can be automatically performed by a suitable source lift servo 40 which can be located, as shown in FIG. 1. Alternately, the servo 40 may be located in the bottom of the chamber of FIG. 1, or in any other desired location.

The type of control of the rod position disclosed in the foregoing is of great importance to the control of the process. Without such control, large fluctuations in production rate occur. However, by sensing the temperature of the reaction mixture with fast acting thermocouples and moving the radiation source rod 31 accordingly, there is, in effect, a control of production rate by adjusting the fraction of the reactor volume that is being irradiated. It should be noted that this control method can be used in any continuous exothermic, adiabatic reaction initiated by high energy radiation.

To demonstrate the novel control operation, a reactor similar to the one of the foregoing figures, but of larger volume, is schematically shown in FIG. 11. It is assumed that the annular volume 64 has an internal diameter of 3 inches, an outside diameter of 10.5 inches and a height of 15 feet. A uniformly loaded Cobalt 60 source rod 31 having a length of 15 feet is loaded into the interior of tube 101 which has a wall thickness of about ¾ inch.

The radiation dose rate ($\theta$) at any point P is given by the expression:

$$\phi = \frac{KS \left[F(\theta_2, b) + F(\theta_1, b)\right]}{a}$$

where

K = is constant,
S = source loading in curies per unit length,
$F = \int_0^{\theta_d} b \sec \theta \, d\theta$,
$b = .79 + (.0805)(r)$ $r$ in inches [based on a specific volume for ethylene at 30,000 p.s.i. at 4540° F. of .0329 ft.³/lb.], and
$a, r, \theta_1, \theta_2$ are shown in FIG. 11.

The function $F(\theta, b)$ is shown in FIG. 12. As shown in FIG. 12, the function is independent of angle or angles over 60°, so that at any given distance from the source, the radiation intensity in chamber 64 will be constant over the entire length of the source 31 up to a few inches of either end.

If the source 31 were not to extend quite to the end of the reactor, then the following equations would apply:

Case A: Over the entire length of the source up to $\theta_1 = 60°$ $$\theta = \frac{2KSF(\pi/2, b)}{a}$$

Case B: From $\theta = 60°$ to the end of the source $$\theta = \frac{KS[F(\pi/2, b) + F(\theta_1, b)]}{a}$$

Case C: At the end of the source ($\theta_1 = 0$)

$$\phi = \frac{KSF(\pi/2, b)}{a} = \frac{1}{2} \text{ Case A}$$

Case D: Past the end of the source $$\phi = \frac{KS[F(\pi/2, b) - F(\theta_1, b)]}{a}$$

Case E: More than $\theta_1 = 60°$ past the end of the source $$\phi = 0$$

The above equations are subject to second order corrections which modify the results by a few percent but do not affect the general conclusions.

FIG. 13 shows the relative production rate per unit volume (proportional to the square root of radiation intensity) as a function of height along the plane halfway between the inner and outer walls of the reactor annulus. Also plotted are the production rates as a function of height for the source 5% withdrawn and 50% withdrawn. FIG. 13 shows that the "effective" volume of the reactor is defined quite sharply by the axial position of the radioactive source 31, so that there is provided an ideal situation of automatically adjusting reactor "size" to total production rate, rather than trying to control production rates in a fixed size reactor. This holds for plug flow as well as backmixed operation, or any degree inbetween.

As a good first approximation, total production rate at a given average temperature is directly proportional to gas flow, and as can be seen from FIG. 13, the end effects are a small percentage of the radiation distribution. Therefore, the same temperature profile and product characteristics will be obtained at 50% gas flow with the source 50% inserted as at design capacity with source fully inserted.

Accordingly, the reactor is controlled by varying the position of the radiation source. This has the advantage of mechanical simplicity, rapid response, and is easily operated by the servo 40 of FIGS. 1 and 11.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A stirrer structure for stirring fluids, said stirrer structure comprising, in combination:
   (a) an elongated chamber;
   (b) means for admitting and withdrawing materials into and out of said elongated chamber;
   (c) a hollow, elongated stirrer drum;
   (d) means for rotatably mounting said hollow elongated stirrer drum concentrically with said elongated chamber;
   (e) means for rotating said hollow elongated stirrer drum;
   (f) said stirrer drum having a plurality of openings therein disposed along the length thereof;
   (g) a plurality of paddle members each secured in a respective opening of said plurality of openings and disposed at an angle to the axis of said drum, thereby to prevent the blocking of their said respective opening;
   (h) said stirrer drum dividing said chamber into a first volume external of said drum and a second volume interiorly of said drum, whereby the rotation of said drum causes an effective circulation of material within said elongated chambers in counterflowing axial directions in said first and second volumes for at least a portion of their lengths; and
   (i) an elongated energy source for initiating a reaction in material introduced into said elongated chamber; said elongated energy source being disposed along the axis of said drum.

2. The stirrer of claim 1 wherein at least one of said paddles has an angular disposition to cause the circulation of material between said first and second volumes and through said opening receiving said at least one of said paddles and wherein said paddles are formed of generally planar members wherein the plane of said paddles is disposed at an angle between 0° and 90° with respect to the plane formed between the axis of said drum and a line perpendicular thereto.

3. The stirrer of claim 2 wherein said elongated energy source is a source of gamma radiation; and a hollow elongated tube enclosing said source of gamma radiation.

4. The stirrer of claim 1 wherein said elongated energy source is a source of gamma radiation; and a hollow elongated tube enclosing said source of gamma radiation.

5. The stirrer of claim 1 wherein said elongated energy source is a source of gamma radiation; and a hollow elongated tube enclosing said source of gamma radiation; and means for axially moving said elongated source of gamma radiation within said elongated tube.

References Cited

UNITED STATES PATENTS

| 3,227,642 | 1/1966 | Lemelson | 204—193 X |
| 3,420,506 | 1/1969 | Gurley | 259—7 |
| 3,460,810 | 8/1969 | Mueller | 259—8 X |

HOWARD S. WILLIAMS, Primary Examiner

U.S. Cl. X.R.

137—347; 259—7